United States Patent
Nakagaki et al.

(10) Patent No.: US 6,492,065 B2
(45) Date of Patent: *Dec. 10, 2002

(54) HOLOGRAM COLOR FILTER, PRODUCTION METHOD OF THE SAME HOLOGRAM COLOR FILTER AND SPACE LIGHT MODULATING APPARATUS USING THE SAME HOLOGRAM COLOR FILTER

(75) Inventors: Shintaro Nakagaki, Kanagawa-ken (JP); Shigeo Shimizu, Kanagawa-ken (JP); Hirofumi Imaoka, Kanagawa-ken (JP)

(73) Assignee: Victor Company of Japan, Limited, Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,675

(22) Filed: Dec. 4, 1998

(65) Prior Publication Data

US 2001/0049061 A1 Dec. 6, 2001

(30) Foreign Application Priority Data

Dec. 5, 1997 (JP) .............................. 9-352217
Jan. 20, 1998 (JP) .............................. 10-009159

(51) Int. Cl.[7] ................................ G03H 1/02
(52) U.S. Cl. ..................... 430/2; 430/1; 359/22; 359/24
(58) Field of Search ............ 430/1, 2; 352/1, 352/3, 20, 22, 24, 15

(56) References Cited

U.S. PATENT DOCUMENTS 3,442,566 A * 5/1969 Forward et al. ............. 359/22

(List continued on next page.)

FOREIGN PATENT DOCUMENTS

| JP | P2-500937 |   | 3/1989 |   |
|----|-----------|---|--------|---|
| JP | 02-141787 | * | 5/1990 |   |
| JP | 03-48883  | * | 3/1991 | ............ 430/2 |
| JP | 03-280078 | * | 12/1991 | ............ 359/22 |
| JP | 06-308332 | * | 11/1994 |   |
| JP | P9-189809 |   | 7/1997 |   |

OTHER PUBLICATIONS

Machine Translation of JP 06–308332.*

Caulfield, et al. "The Application of Holography", Wiley–Interscience, pp. 48–49, 1970.*

English translated abstract for Japanese Patent No. P9–189809.

English translated abstract for Japanese Patent No. P2–500937

*Primary Examiner*—Martin Angebranndt
(74) *Attorney, Agent, or Firm*—Gary M. Nath; Harold L. Novick; Marvin C. Berkowitz

(57) ABSTRACT

A thickness of each hologram lens for forming a hologram color filter is set so as to be smaller as the wavelength of light to be diffracted by each hologram lens is shorter. A thin plate glass layer is bonded to a surface of the hologram color filter such that it is in a firm contact therewith by adhesive agent and a sum of the thickness of the thin plate glass layer and thickness of the adhesive agent is smaller than the shortest focal length of the focal lengths in glass of a plurality of the hologram lenses. As a result, light diffracted and divided by the hologram color filter is focused on a picture element electrode of a corresponding color properly thereby eliminating deterioration of color reproduction due to mixing of colors. Further, upon production of the hologram color filter from hologram recording material, an influence of a fringe rotation is compensated.

4 Claims, 9 Drawing Sheets

AFTER HEAT DEVELOPMENT

U.S. PATENT DOCUMENTS

| | | | | |
|---|---|---|---|---|
| 4,807,978 A | * | 2/1989 | Grinberg et al. | 359/24 |
| 4,942,102 A | * | 7/1990 | Keys et al. | 430/1 |
| 4,978,182 A | * | 12/1990 | Tedesco | 350/3.7 |
| 5,506,701 A | * | 4/1996 | Ichikawa | 359/15 |
| 5,606,433 A | * | 2/1997 | Yin et al. | 359/24 |
| 5,672,448 A | * | 9/1997 | Isogai et al. | 430/1 |
| 5,731,108 A | * | 3/1998 | Biles | 430/2 |
| 5,894,359 A | * | 4/1999 | Suzuki et al. | 359/24 |
| 5,930,011 A | * | 7/1999 | Gambogi, Jr. et al. | 430/1 |
| 5,999,282 A | * | 12/1999 | Suzuki et al. | 359/20 |

* cited by examiner

PRIOR TO HEAT DEVELOPMENT

AFTER HEAT DEVELOPMENT

PRIOR TO HEAT DEVELOPMENT

AFTER HEAT DEVELOPMENT

HOLOGRAM COLOR FILTER, PRODUCTION METHOD OF THE SAME HOLOGRAM COLOR FILTER AND SPACE LIGHT MODULATING APPARATUS USING THE SAME HOLOGRAM COLOR FILTER

BACKGROUND OF THE INVENTION

1. Field of the Invention

The present invention relates to space light modulating technology for use in a projector, display unit, printing and the like, and more particularly to a hologram color filter, production method of the hologram color filter and space light modulating apparatus using the hologram color filter.

2. Description of the Related Art

A space light modulating apparatus using the hologram color filter such as a color display unit has such an advantage in that its use efficiency of light is higher as compared to the color display unit using an ordinary color filter. For example, Japanese Patent Application Laid-Open No.2-500937 has disclosed a color display unit and method thereof using the hologram lens, in which the hologram lenses for red(R), green(G) and blue(B) are arranged horizontally in line in front of a stripe target such that they are disposed on multiple vertical stages so as to form each focal point on a target plane through each of the lenses thereby ensuring a high reading light efficiency.

Further, the Japanese Patent Application Laid-Open No.9-189809 (Japanese Patent Application No.7-315956) has disclosed a projection type display apparatus provided with a space light modulating unit which divides an incident light by diffraction to plural light beams having different wavelength bands as a color separating means and selectively collects light of each wavelength band at a picture element position of a corresponding color.

In the space light modulating unit employed in this conventional projection type display apparatus, its hologram color filter has such a characteristic that the diffraction efficiency of one polarized wave (hereinafter referred to as first polarized wave) of S polarized wave and P polarized wave with respect to a light impinging at a predetermined incident angle is kept substantially maximum while a difference of the diffraction efficiency between the first polarized wave and other polarized wave (hereinafter referred to as second polarized wave) is more than 30%. Of lights impinging upon this hologram color filter, the first polarized wave is diffracted by the hologram color filter and divided to spectrum, and then selectively converged to a picture element electrode position of a corresponding color on the liquid crystal display. The lights converged selectively to each picture element electrode is subjected to light modulation relating to video signal of a corresponding color, reflected and impinges again upon the hologram color filter. Then, the hologram color filter projects a polarized wave passing therethrough without being diffracted to a screen in an enlarged size.

A conventional space light modulating apparatus using the hologram color filter will be described more in detail with reference to FIG. 1.

The hologram color filter 1 comprises three layers of a hologram lens 1B for blue (B), a hologram lens 1G for green (G) and a hologram lens 1R for red (R). White light emitted from a xenon lamp or a metal-halide lamp (not shown) impinges upon the hologram lens 1B of the top layer of the hologram color filter 1. Here, only the B component is diffracted, and then focused and impinges upon the space light modulating element 3 constituted of a LCD panel by an operation of the lens. The G and R lights not diffracted by the hologram lens 1B for B advance straight in the hologram lens 1B for B and impinges upon the hologram lens 1G for G. Then, only the G component is diffracted and focused and impinges upon the space light modulating element 3 by an operation of the lens. Then, the R light not diffracted by the hologram lens 1G for G advances straight in the hologram lens 1G for G and then impinges upon the hologram lens 1R for R. Here, this light is diffracted and focused and impinges upon the space light modulating element 3 by an operation of the lens.

The space light modulating element 3 is constituted of a transparent electrode layer 4, picture element electrode layer 5 and liquid crystal 6 which is disposed therebetween and sealed such that it is sandwiched by an orientation film (not shown). A plurality of the picture element electrode layers 5 are provided for each of R, G and B so that they are driven by the R, G, B picture element signals. Then, the B light converged by the hologram lens 1B for B impinges upon the B picture element electrode 5B. The G light converged by the hologram lens 1G for G impinges upon the G picture element electrode 5G. The R light converged by the hologram lens 1R for R impinges upon the R picture element electrode 5R.

A voltage corresponding to a picture element signal is applied between the picture element electrode layer 5 and transparent electrode layer 4 of the incident side. Polarization and modulation corresponding to an extent of this voltage are executed on the incident light by the liquid crystal 6. For example, if a liquid crystal oriented vertically is used as the liquid crystal 6, a portion corresponding to a picture element signal of light impinging as S wave component becomes P wave component. Light after modulation is reflected by the picture element electrode layer 5 (or dielectric material mirror) and impinges upon the hologram color filter 1 again. The P wave component of this light passes through the hologram color filter 1 as it is. As a result, it comes that only a component corresponding to the picture element is taken out. By projecting this transmission light onto a screen, a picture is displayed. Meanwhile, most of the S wave component of the light impinging upon the hologram color filter 1 again is diffracted again, advances in an opposite direction to the incident light and returns to a light source. By providing a polarizer allowing the P wave component to pass in the output light path as required, the S wave component passing through the hologram color filter 1 can be cut off.

Next, a production method of the hologram color filter having three layers will be described with reference to FIGS. 2A–2D. First, an EB lattice 7 constructed in the form of a concave lens by electron beam (EB) as shown in FIG. 2A is used. The EB lattice 7 has a lattice construction having continuously differing pitches corresponding to the lens. A plurality of the lattices 7 are provided continuously on the surface of the glass substrate 8 so that the EB master (exposure master) 9 is formed as shown in FIG. 2B. A layer of hologram recording material 11 is formed on the surface of the other glass substrate 10 appropriately such that the hologram recording material 11 is disposed so as to oppose the EB master 9 in a condition that it is in contact with the EB master 9.

With this condition, exposure light 12 is irradiated from an exposure light source (not shown) at a predetermined angle as indicated by an arrow in FIG. 2B. Consequently, as shown in FIG. 2A, 0 order light L0 which advances straight and primary order light L1 diffracted by the lattice are obtained. Although a small amount of higher order light are produced as the diffracted light depending on the case, this matter is omitted in a following description to facilitate understanding. Because the hologram recording material 11 is disposed below the EB master as described above, interference pattern between the 0 order light L0 and primary order light L1 is formed. As a result, a refractivity distribution similar to the interference pattern, or a hologram lens is formed on the hologram recording material 11. As other production method, the reference light is used from an oblique direction as the 0 order light and the object wave is irradiated vertically as the primary order light so as to make both the lights interfere with each other.

To form a hologram color filter having three layers as shown in FIG. 1, first of all, the hologram recording material 11 is exposed by the EB master 9 for B so as to form a hologram lens 1B for B. Next, as shown in FIG. 2C, the hologram recording material 11 is provided on the hologram lens 1B for B. Then, an EB master 13 for G is disposed so as to oppose the hologram recording material 11 and the hologram recording material 11 is exposed so as to form a hologram lens 1G for G. Further, as shown in FIG. 2D, the hologram recording material 11 is provided on.the hologram lens 1G for G and an EB master 14 for R is disposed so as to oppose the hologram recording material 11 and the hologram recording material 11 is exposed so as to form a hologram lens 1R for R. By forming the three layers of the hologram recording material and repeating the exposure operation by the EB master for each layer three times, the hologram color filter 1 having the three layers is produced.

Although the thicknesses of the hologram lenses 1R, 1G, 1B for R, G, B are substantially the same, there is such a problem that light availability differs depending on color because the diffraction efficiency in each of the hologram lenses 1R, 1G, 1B differs depending on the wavelength of light or color of the light.

Further, the aforementioned Japanese Patent Application Laid-Open No.9-189809 has not mentioned a thickness of the thin plate glass layer provided on a reading light emission side of the hologram color filter formed by overlaying a plurality of the different hologram lenses relating to the three primary colors or carrying out multiple exposures to a single-layer hologram light sensitive film by a plurality of the hologram lenses.

That is, according to the structure shown in FIG. 1 of the aforementioned patent application(Japanese Patent Application No.7-315956), the emission lights from the hologram color filters 3 of three layers corresponding to the three primary colors are made to converge on each corresponding picture element electrode layer 13. Thus, the focal lengths of the hologram lens arrays 3r, 3g, 3b are set to be different such that the focal points of the hologram lens arrays 3r, 3g, 3b of each corresponding color exist on a same plane apart from the surface of the hologram color filter by each desired distance.

However, such a conventional art shown in FIG. 3 has a following problem. That is, because the same patent application has not mentioned particularly the thickness of the thin plate glass layer, if the sum thickness (t11+t12) of the thickness of the thin plate glass layer 21 and thickness of the adhesive agent layer 39 bonded to the reading light emission side of the hologram color filter 1 is larger than the shortest focal length L1 in glass of the hologram lenses 1R, 1G, 1B of corresponding colors, emission light from the thin plate glass layer 21 becomes radiant light, so that one color light on the picture element electrode 5R, 5G, 5B of the picture element electrode layer 5 is mixed with another color light adjacent thereto thereby inducing mixing of the colors shown in FIG. 4. Therefore, the reproductivity of colors is worsened.

There is another problem to solve. That is, when each hologram lens is formed, in FIG. 2B, if the exposure light 12 is irradiated to the hologram recording material 11 of each layer, a fringe pattern is formed thereon and by heat developing this, the refractivity change is intensified so as to produce a one-layer hologram lens. The refractivity change of the hologram recording material 11 depends on the space of the fringe pattern and inclination angle determined by the 0 order light (reference light) and primary order light (object light).

FIGS. 5 and 6 show this state and indicate a one-layer hologram lens 1B (1G, 1B) as a representative.

If the reference light 15 is irradiated obliquely to the hologram recording material 11 and the object light 16 is irradiated thereto vertically as shown in FIG. 5, the fringe pattern 17 of the angle α is formed in an oblique direction. These lights correspond to the 0 order light and primary order light as described above. The direction of this fringe pattern 17 is a direction for dividing an intersection angle θ between the reference light 15 and object light 16 to two parts. The angles θ1, θ2 formed by the direction of the fringe pattern 17 and directions of both the lights 15, 16 are such that θ1=θ2 or they are of the same angle.

As described above, the hologram recording material 11 in which the fringe pattern 17 is formed is subjected to heat development treatment by adding heat to intensify the refractivity change. As a result, the fringe pattern 17 rises at a slight angle Δα as shown in FIG. 6 so as to increase the inclination angle. This phenomenon is called fringe rotation. If this fringe rotation occurs when the maximum efficiency is desired to be obtained, when the reproduction light 18 is projected to the hologram lens 1B(1G, 1R) from an oblique direction of a predetermined angle, sometimes the diffracted light 18A is emitted in a direction deviated at a slight angle Δθ from vertically downward although this light is set to be emitted vertically downward in the same Figure. Therefore, it comes that this diffracted light 18A does not reach a desired picture element.

SUMMARY OF THE INVENTION

Accordingly, the present invention has been made to solve such a problem of the conventional art and therefore, an object of the invention is to provide a hologram color filter capable of improving light availability and a space light modulating apparatus using the same.

Another object of the invention is to provide a production method of a hologram color filter capable of emitting a diffracted light in a desired direction at an optimum efficiency by compensating for a fringe rotation and a space light modulating apparatus using a filter produced according to the same method.

Still another object of the invention is to provide a hologram color filter suitable for achieving a projection type display unit excellent in reproduction of color without mixing of colors.

To achieve the above object, there is provided a hologram color filter having two or more hologram lenses, wherein the thickness of each layer of the hologram lenses having two or more layers is smaller as the wavelength of light to be diffracted by each layer is shorter.

Because according to the present invention, the diffraction efficiency can be improved, the light availability can be also improved.

According to a preferred embodiment of the present invention, the thickness of each of the hologram lenses having two or more layers accurately corresponds to a ratio of the wavelength of light to be diffracted by each layer.

By using the aforementioned hologram color filter in a space light modulating apparatus, the light availability can be improved and further, a desired light can be emitted from a desired picture element.

Further, to achieve the above object, there is provided a space light modulating apparatus comprising: a hologram color filter formed by overlaying a plurality of different hologram lenses relating to the three primary colors or carrying out multiple exposures on a single layer hologram light sensitive film by the plurality of the hologram lenses, the hologram color filter diffracting incident white reading light to a plurality of light beams having each different wavelength and focusing each thereof onto a picture element electrode of each corresponding color; a thin plate glass layer provided in a firm contact with reading light emission side of the hologram color filter; and a space light modulating element for modulating light diffracted by the hologram color filter, the space light modulating apparatus being so constructed that the thickness of the thin plate glass layer is smaller than the shortest focal length of the focal lengths in glass of each of the plurality of the hologram lenses.

According to a preferred embodiment of the present invention, the thin plate glass layer is bonded to a reading light emission side surface of the hologram color filter via adhesive agent and a sum of the thickness of the adhesive agent and thickness of the thin plate glass layer is smaller than the shortest focal length of the focal lengths in glass of each of the plurality of the hologram lenses.

According to the present, invention, the distance between the hologram color filter and picture element electrode layer can be so adjusted that the three primary colors separated by the hologram color filter are converged onto each corresponding picture element properly and therefore, a space light modulating apparatus excellent in reproduction of color without mixing of colors can be achieved.

Further, to achieve the above object, there is provided a method for producing a hologram color filter comprising the steps of: forming a fringe pattern on a hologram recording material; creating a one-layer hologram lens by heat-development of the hologram recording material; providing a further hologram recording material on the one-layer hologram lens; and repeating the above procedure so as to create a multiple layer hologram lens, wherein the fringe pattern to be formed on the hologram recording material is formed at a recording angle for compensating for a fringe rotation such that light having a desired wavelength is emitted in a desired direction.

According to a preferred embodiment of the present invention, the desired direction is a normal direction of the hologram color filter.

According to this invention, the fringe pattern prior to heat development is formed in such a condition that it is rotated by an angle corresponding to the rotation angle of a fringe rotation in an opposite direction thereto. Therefore, the fringe pattern after heat development is formed in a desired direction as designed.

Further, by employing a hologram color filter produced according to the above method in the space light modulating apparatus, the diffracted light is emitted in a desired direction with a desired diffraction efficiency as designed, so that the diffracted light hits a desired picture element accurately.

The nature, principle and utility of the invention will become more apparent from the following detailed description when read in conjunction with the accompanying drawings.

DESCRIPTION OF THE PREFERRED EMBODIMENTS

Hereinafter, the embodiments of the present invention will be described in detail with reference to the accompanying drawings.

Figure 1:
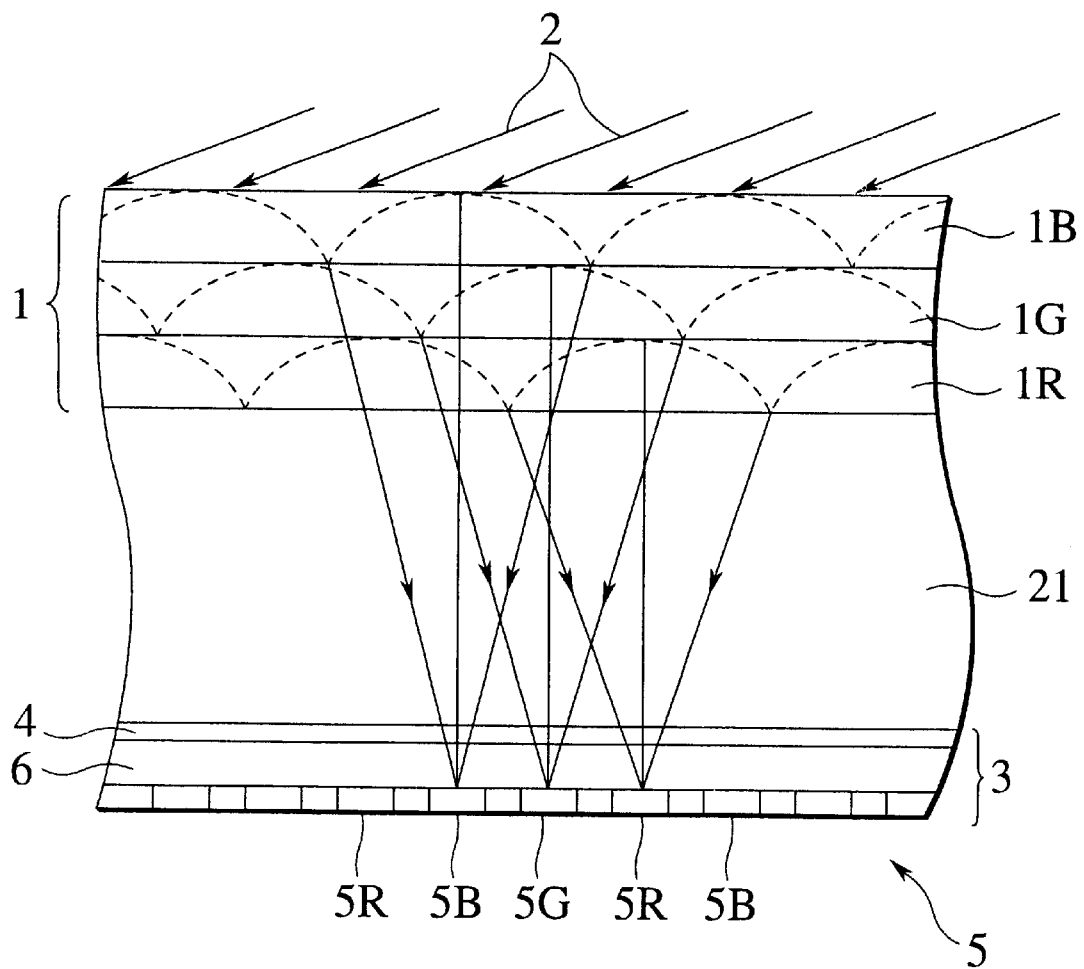
FIG. 1 is a sectional view of a conventional space light modulating apparatus using a hologram color filter.
Figure 2A:
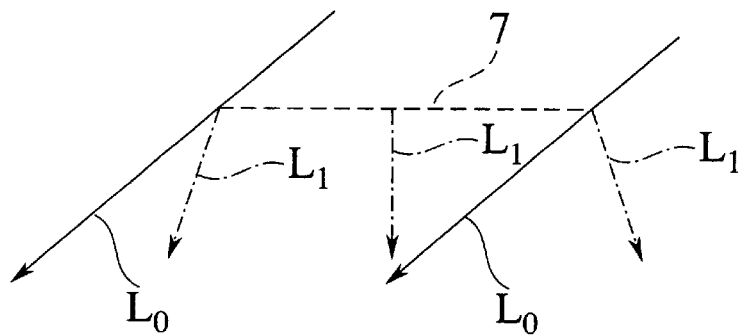
FIGS. 2A–2D are diagrams for explaining a production method for producing a hologram color filter having three layers.
Figure 2B:
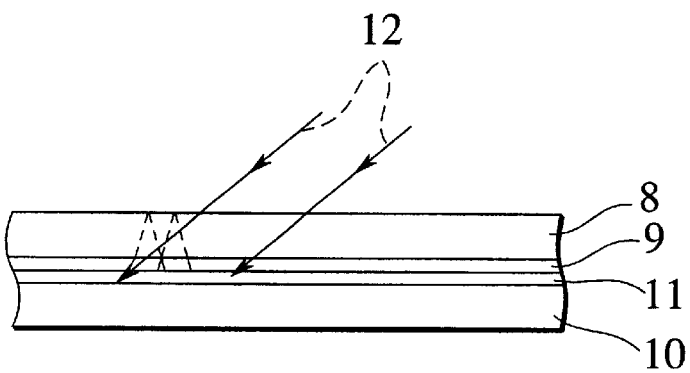
Figure 2C:
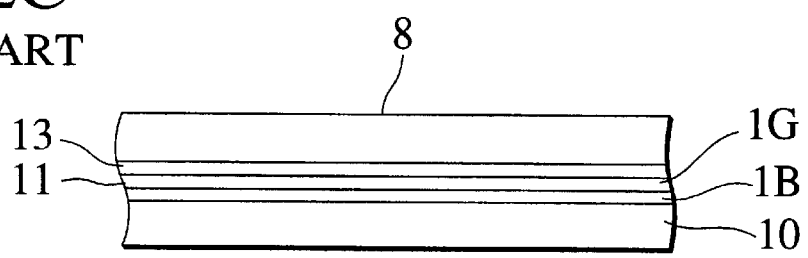
Figure 2D:
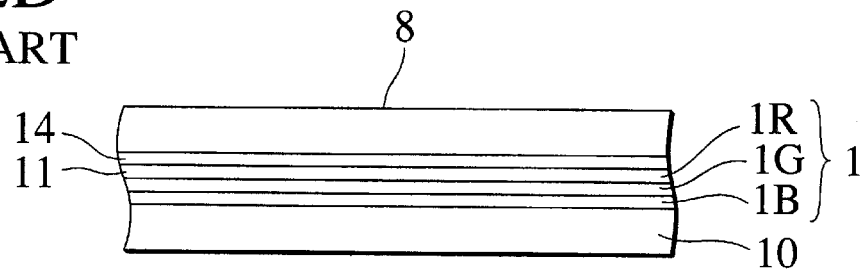
Figure 7:
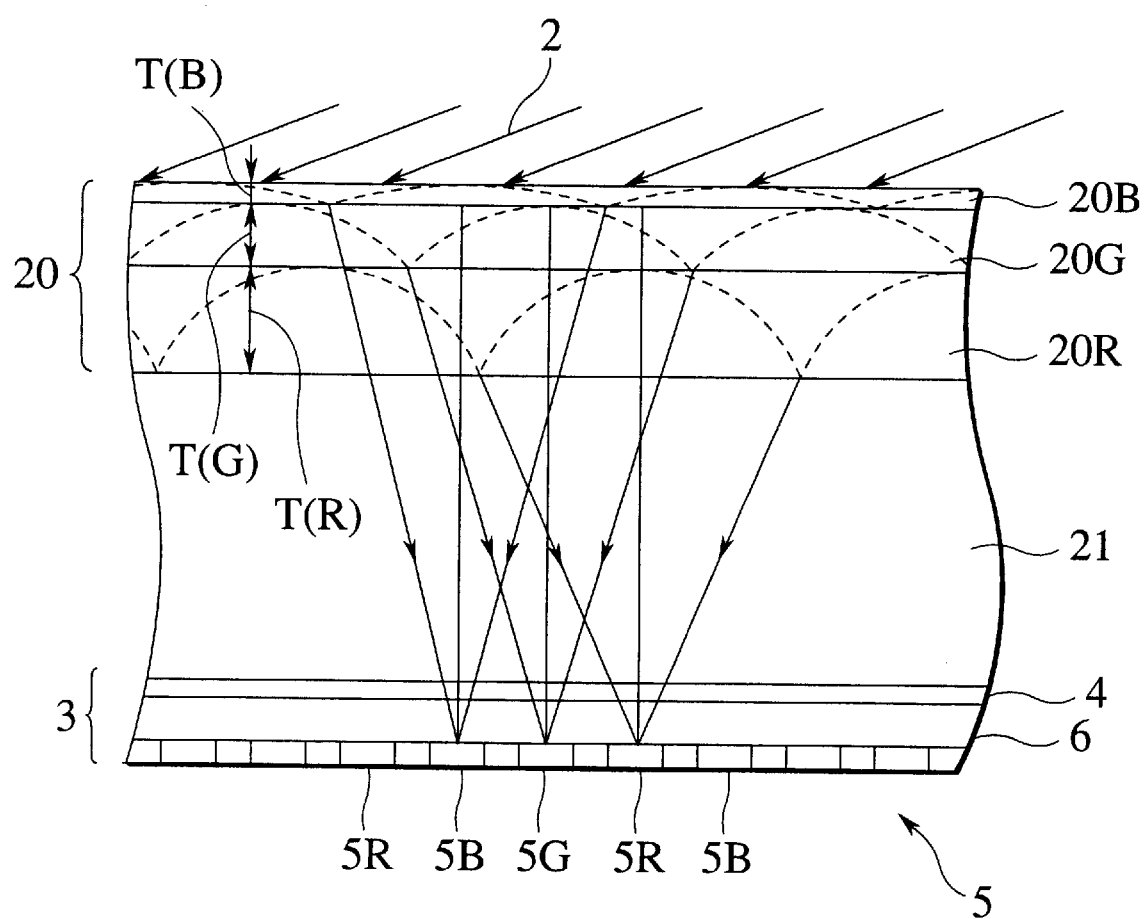
FIG. 7 is a sectional view showing an embodiment of a space light modulating apparatus of the present invention.
Figure 8:
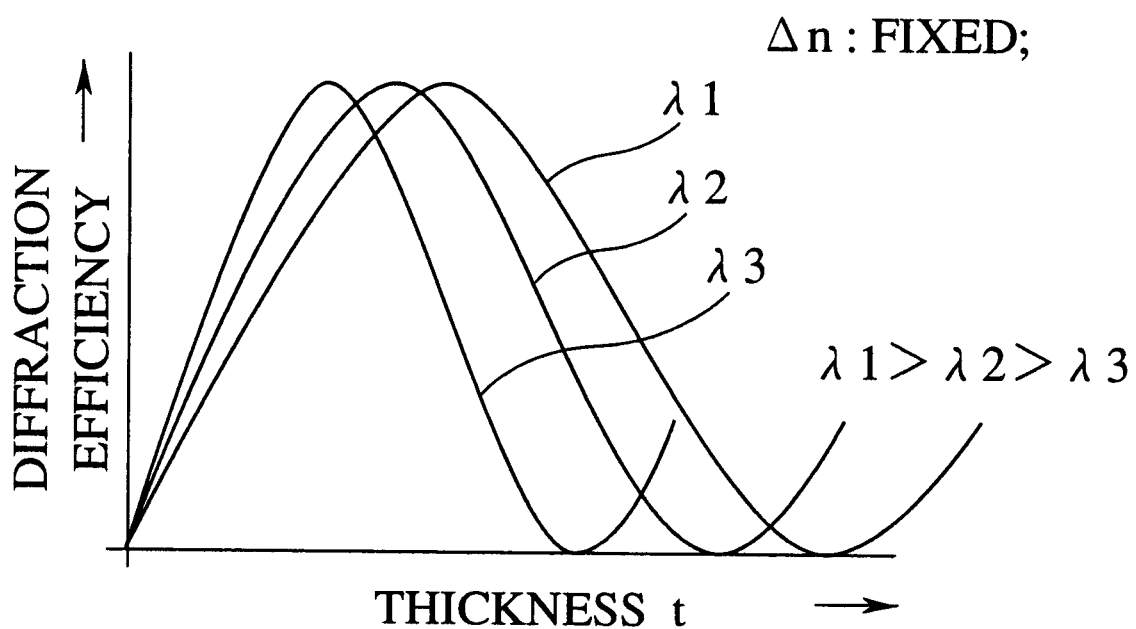
FIG. 8 is a graph showing a relation between the thickness of a hologram lens and diffraction efficiency.

FIG. 7 is a sectional view showing an embodiment of a space light modulating apparatus of the present invention. FIG. 8 is a graph showing a relation between the thickness of the hologram lens and diffraction efficiency. This embodiment comprises a hologram color filter 20 and a space light modulating element 3 and both the components are joined together by a thin-plate glass layer 21 having a desired thickness (which will be referred to later). A point that the hologram color filter 20 of the present invention is different from a conventional hologram color filter is that although each hologram lens constituting the conventional hologram color filter has substantially the same thickness shown in FIG. 1, respective hologram lenses 20B, 20G, 20R constituting the hologram color filter 20 of the present invention have each different thickness mainly depending upon the wavelength of diffracted light. That is, thickness T(B) of the hologram lens for B, thickness T(G) of the hologram lens for G and thickness T(R) of the hologram lens for R are determined mainly depending on the wavelength of light to be diffracted and a relation of T(B)<T(G)<T(R) is set.

Therefore, the thickness T(R) of the hologram lens 20R for R is set to the largest value while the thickness T(B) of the hologram lens 20B for B is set to the smallest value. Each of these thicknesses is set considering diffraction efficiency and such a thickness allowing the diffraction efficiency to come near its peak value is selected.

Generally, the diffraction efficiency of the hologram lens depends on the wavelength A of diffracted light and refractivity change Δn. For example, with the refractivity change Δn fixed to be a constant value and wavelength λ set to be a parameter, a relation between the thickness t and diffraction efficiency is as shown in FIG. 8.

That is, the wavelength A is in a relation of λ1>λ2>λ3 and if the thickness t is changed, the diffraction efficiency changes in the form of sine curve. Further, the shorter the wavelength λ, the more the peak of the diffraction efficiency is shifted to the left, so that the thickness decreases. Therefore, the thickness of each of the hologram lenses of three layers for RGB is set near its peak value mainly corresponding to the wavelength of light to be diffracted so as to obtain each optimum thickness. As a result, the diffraction efficiency is raised thereby the light utilization ratio being improved. Actually, in case the refractivity change Δn is assumed to be 0.045, the optimum thickness corresponding to each of wavelengths of RGB is 3.6 μm when the diffraction wavelength is 460 nm(B), 4.3 μm when the diffraction wavelength is 550 nm(G), and 4.9 μm when the diffraction wavelength is 640 nm(R).

An actual operation of this apparatus is the same as the conventional one. That is, white light emitted from a xenon lamp or metal-halide lamp (not shown) impinges upon the hologram lens 20B for B of the top layer of the hologram color filter 20. Then, here, only the B component is diffracted and impinges upon the space light modulating element 3 constituted of a LCD panel because of a function of the lens. The G and R lights not diffracted by the hologram lens 20B for B advances straight in the hologram lens for B and impinges upon the next hologram lens 20G for G. Here, only the G component is diffracted and impinges upon the space light modulating element 3 by a function of the lens. Next, the R light not diffracted by the hologram lens for G advances straight in the hologram lens 20G for G and impinges upon the hologram lens 20R for R. Then, this light is diffracted and impinges upon the space light modulating element 3 by a function of the lens.

The space light modulating element 3 is constituted of a transparent electrode layer 4, picture element electrode layer 5 and liquid crystal 6 which is disposed therebetween and sealed such that it is sandwiched by an orientation film (not shown). A plurality of the picture element electrode layers 5 are provided for each of R, G and B so that they are driven by the R, G, B picture element signals. Then, the B light converged by the hologram lens 20B for B impinges upon the B picture element electrode 5B. The G light converged by the hologram lens 20G for G impinges upon the G picture element electrode 5G. The R light converged by the hologram lens 20R for R impinges upon the R picture element electrode 5R.

A voltage corresponding to a picture element signal is applied between the picture element electrode layer 5 and the transparent electrode layer 4 of the incident side. Polarization and modulation corresponding to an extent of this voltage are executed on the incident light by the liquid crystal 6. For example, if a liquid crystal oriented vertically is used as the liquid crystal 6, a portion corresponding to a picture element signal of light impinging as S wave component becomes P wave component. Light after modulation is reflected by the picture element electrode layer 5 (or dielectric material mirror) and impinges upon the hologram color filter 20 again. The P wave component of this light passes through the hologram color filter 20 as it is. As a result, it comes that only a component corresponding to the picture element is taken out. By projecting this transmission light onto a screen, a picture is displayed. Meanwhile, most of the S wave component of the light impinging upon the hologram color filter 20 again is diffracted again, advances in an opposite direction to the incident light and returns to a light source. By providing a polarizer allowing the P wave component to pass in the output light path as required, the S wave component passing through the hologram color filter 20 can be cut off.

Because in such an operation, the thicknesses of the hologram lenses 20B, 20G, 20R are optimized with the relation of T(B)<T(G)<T(R) as described above, the light availability can be improved with the diffraction efficiency of each layer being maximum.

Even if the thickness of each hologram lens is not set so that the diffraction efficiency reaches a peak value, if it is set to a value substantially near that peak value under the relation of T(B)<T(G)<T(R), the light efficiency can be improved as compared to the conventional apparatus.

Because according to this embodiment, the thickness of each layer of the hologram lenses is set thinner as the wavelength of light to be diffracted becomes shorter, the diffraction efficiency is improved, thereby making it possible to improve the light availability of each layer of the hologram lens.

Figure 9:
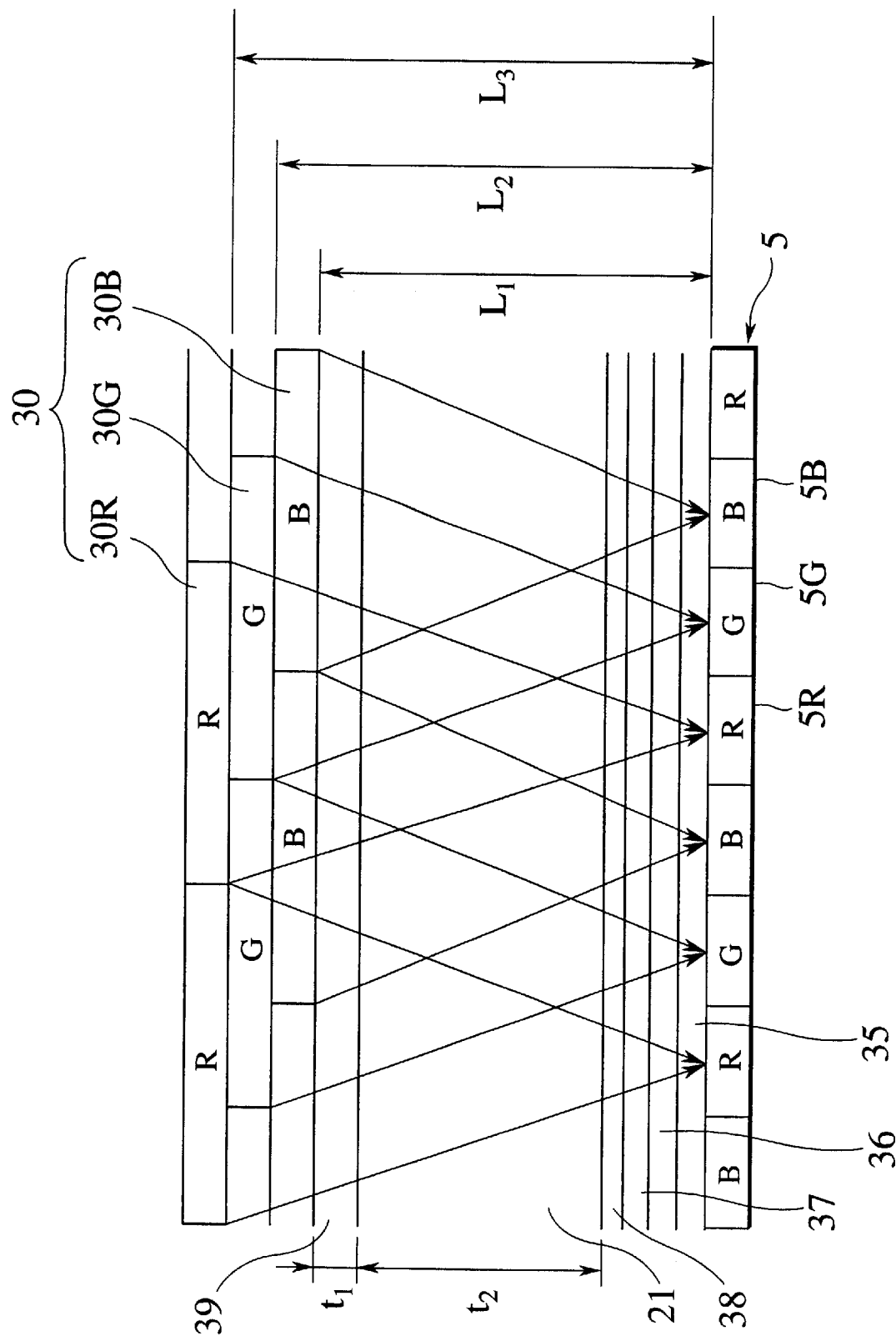
FIG. 9 is a sectional view showing a second embodiment of a space light modulating apparatus of the present invention.

FIG. 9 is a sectional view showing a second embodiment of the space light modulating apparatus of the present invention.

Referring to FIG. 9, the hologram color filter 30 is formed by overlaying hologram lens layers 30B, 30G, 30R having focal length L1, L2, L3 or by carrying out multiple exposures to a single-layer hologram light sensitive film by hologram lens array corresponding to each color at the focal length of L1(FIG. 9 shows a hologram lens array formed by overlaying the lenses). A thin plate glass 21 is bonded to a surface of the hologram color filter 30 through a bonding layer 39.

The picture element electrode layer 5 is like the conventional type, and formed by disposing the respective picture element electrodes 5B, 5G, 5R corresponding to three primary colors B, G, R in matrix form. The picture element electrode layer 5 is disposed on a surface of the thin plate glass 21 via common electrode film 38, orientation films 35, 37 and light modulating layer (liquid crystal layer) 36. Unlike the conventional apparatus, the present invention does not utilize a dielectric mirror.

The focal lengths L1, L2, L3 in each glass of the hologram lenses 30B, 30G, 30R relating to the three primary colors of the hologram color filter are set so as to exit in the vicinity of the surface of the respective picture element electrodes 5B, 5G, 5R. As for the thicknesses of the bonding layer 39 and thin plate glass layer 21, if the thicknesses thereof are assumed to be t1 and t2, the sum value (t1+t2) is set so as to be smaller than the shortest focal length L1 of the focal lengths L1, L2, L3 of the hologram lenses 30B, 30G, 30R.

If a concrete structure is exemplified, following specifications can be set. The focal lengths L1, L2, L3 in each glass of the hologram lenses 30B, 30G, 30R are determined according to a relation with the pitch of the respective picture element electrodes 5B, 5G, 5R. If the pitch is 7–13 μm, it comes that L1=60 μm, L2=69 μm, L3=78 μm. Then, the thickness of the thin plate glass 21 is t2=50 μm and the thickness of the bonding layer 39 is t1=7 μm. Consequently, the sum (t1+t2)=57 μm(<L1=60 μm). Meanwhile, the thickness of the common electrode film 38 is 40 nm and the thickness of the light modulating layer 36 is 39 μm and the thickness of the orientation films 35, 37 is 25 nm in case of, for example, $SiO_2$.

Figure 3:
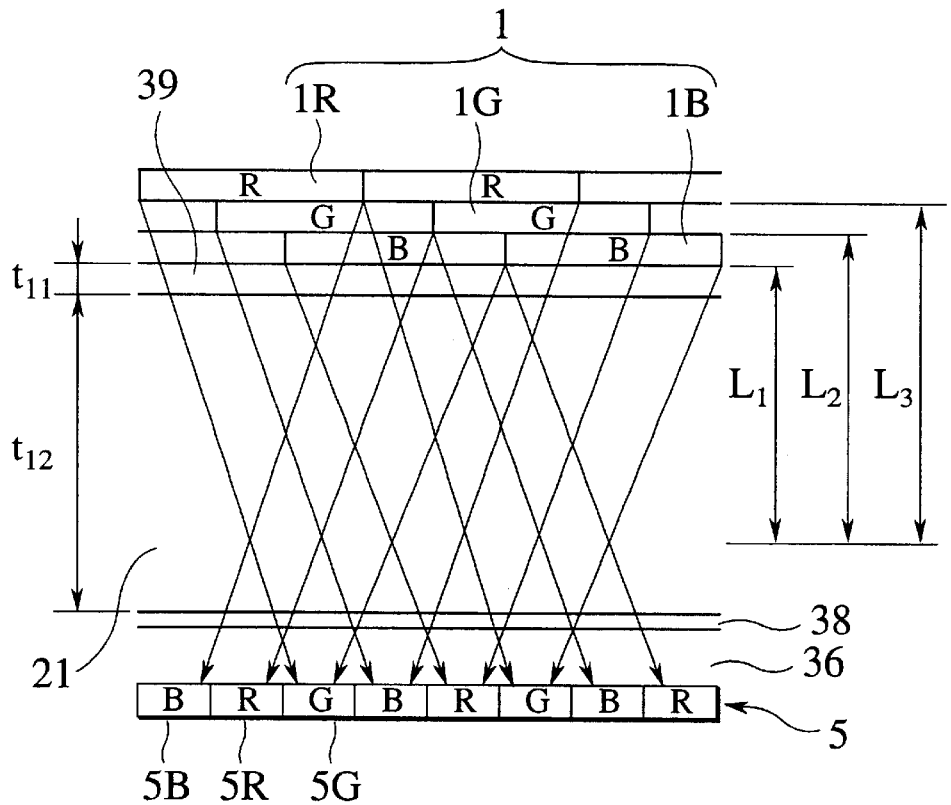
FIG. 3 is a sectional view of a conventional space light modulating apparatus using a hologram color filter.
Figure 4:
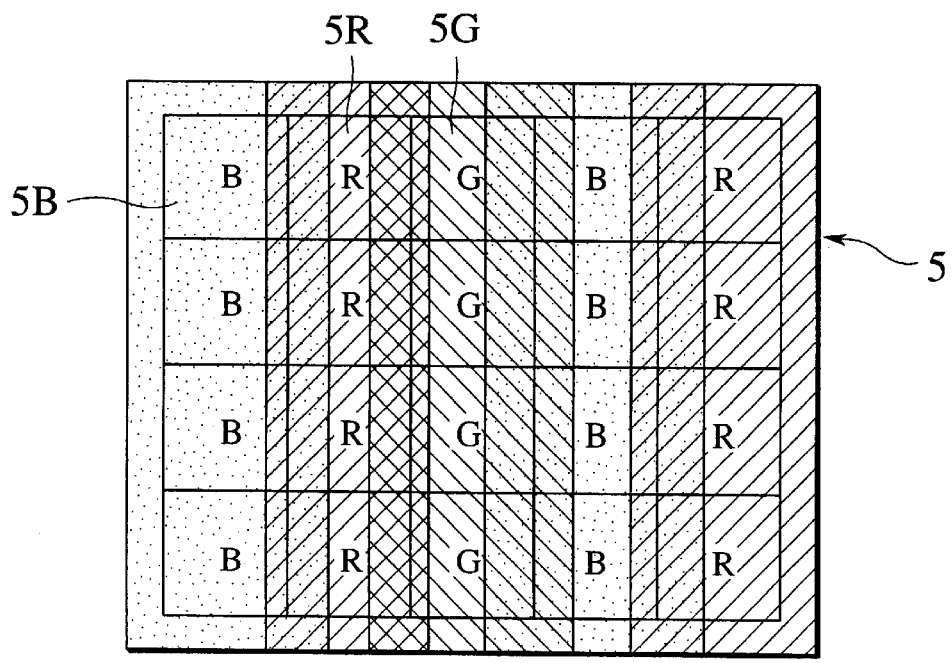
FIG. 4 is a plan view showing focusing of light on a picture element electrode layer of a conventional art.
Figure 5:
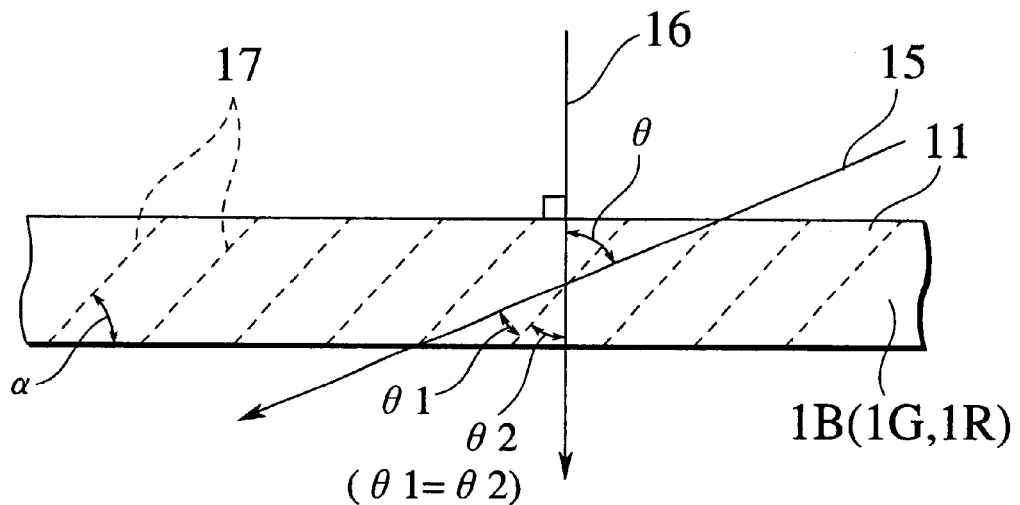
FIG. 5 is a diagram showing a hologram lens forming step.
Figure 6:
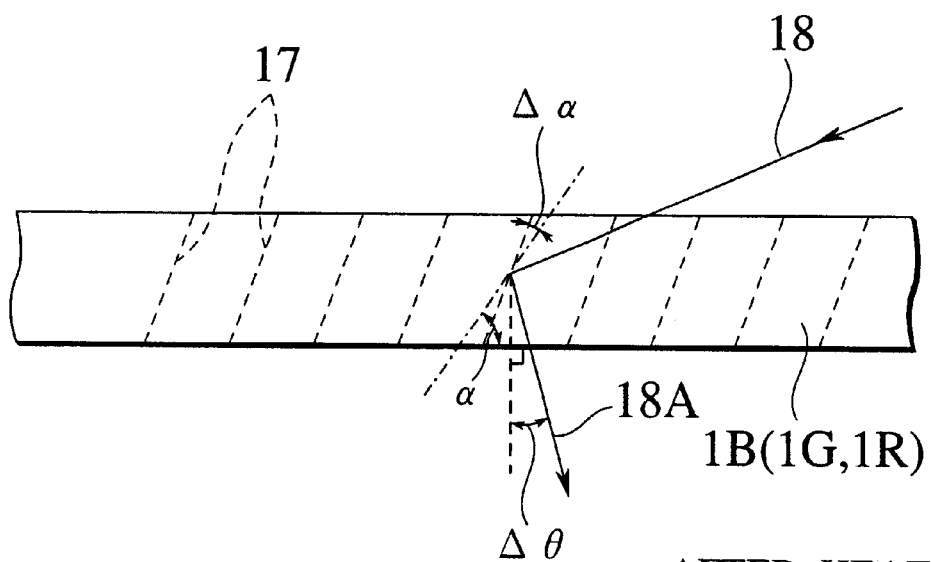
FIG. 6 is a diagram showing a hologram lens forming step.

As a result, according to the present invention, it is never impossible to focus the three primary colors separated by the hologram color filter onto corresponding picture element electrodes 5B, 5G, 5R properly even if the adjustment of the distance between the thin plate glass 21 and picture element electrode layer 5 is carried out, while according to the conventional case shown in FIGS. 3 and 4, it is impossible to focus the three primary colors separated by the hologram color filter onto corresponding picture element electrodes 5B, 5G, 5R properly because the sum (t11+t12) of the thickness of the thin plate glass 21 and thickness of the bonding layer 39 is larger than the shortest focal length L1 in the glass of each of the hologram lenses 30B, 30G, 30R. For this reason, the distance between the thin plate glass 21 and picture element electrode layer 5 of the hologram color filter assembly can be adjusted so that the three primary colors separated by the hologram color filter 30 are focused to the corresponding picture element electrodes 5B, 5G, 5R properly, and therefore there is no fear that a color light may be mixed with another color light adjacent on the respective picture element electrodes 5B, 5G, 5R of the picture element electrode layer 5, thereby making it possible to achieve a projection type display unit in which mixing of colors is not caused and reproduction of color is excellent.

As described above, according to this embodiment, the thickness of the thin plate glass layer provided adjacent to the hologram color filter is set to be smaller than the shortest focal length in the glass of a lens of each corresponding color of the hologram lens array or in case the thin plate glass layer is brought into a firm contact with the hologram color filter through the bonding layer, the sum of the thickness of the bonding layer and thickness of the thin plate glass layer is set to be smaller than the shortest focal length in the glass of the lens of each corresponding color of the hologram lens array. Thus, the distance between the thin plate glass layer and the picture element electrode can be adjusted so that the three primary colors separated by the hologram color filter are focused on the corresponding picture element electrodes properly, thereby making it possible to achieve a projection type display unit in which mixing of colors is not caused and reproduction of color is excellent.

Then, an embodiment of production method of the hologram color filter of the present invention will be described below.

An object of this embodiment is to compensate for a fringe rotation which occurs when each of the above described hologram lens is produced. That is, by projecting 0 order light (reference light) and primary order light (object light) onto a hologram recording material so as to make both of them interfere with each other, the fringe pattern is formed obliquely relative to the thickness direction. Next, to intensify the refractivity change, heat is added so as to produce heat development for producing the hologram lens. However, in this process of heat development, an inclination angle of the fringe pattern slightly turns so that the direction of emission of the diffracted light is deviated, which is a problem of the conventional art.

To solve this problem, according to the present invention, the fringe pattern is preliminarily formed such that it is inclined in an opposite direction at an angle corresponding to the rotation angle of the fringe pattern due to the heat development, thereby compensating for the fringe pattern rotation.

Due to such heat development, the fringe pattern changes as if it stands with respect to the hologram recording material, that is, as if the inclination thereof relative to a direction parallel to the hologram recording material increases. Therefore, according to the present invention, the fringe pattern is formed in such a condition that it is inclined in an opposite direction by that change amount.

Figure 10:
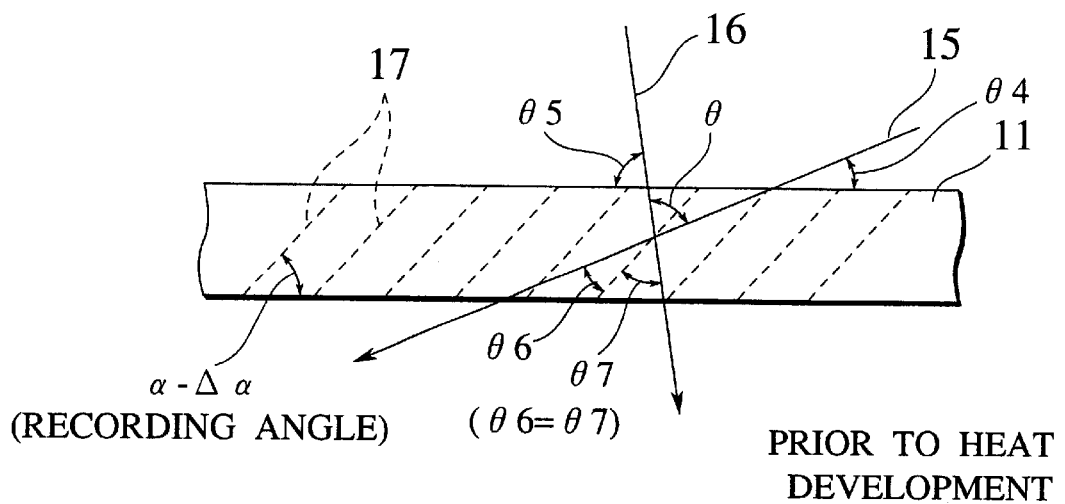
FIG. 10 is a diagram showing a one-layer hologram recording material prior to heat development for forming the hologram lens.
Figure 11:
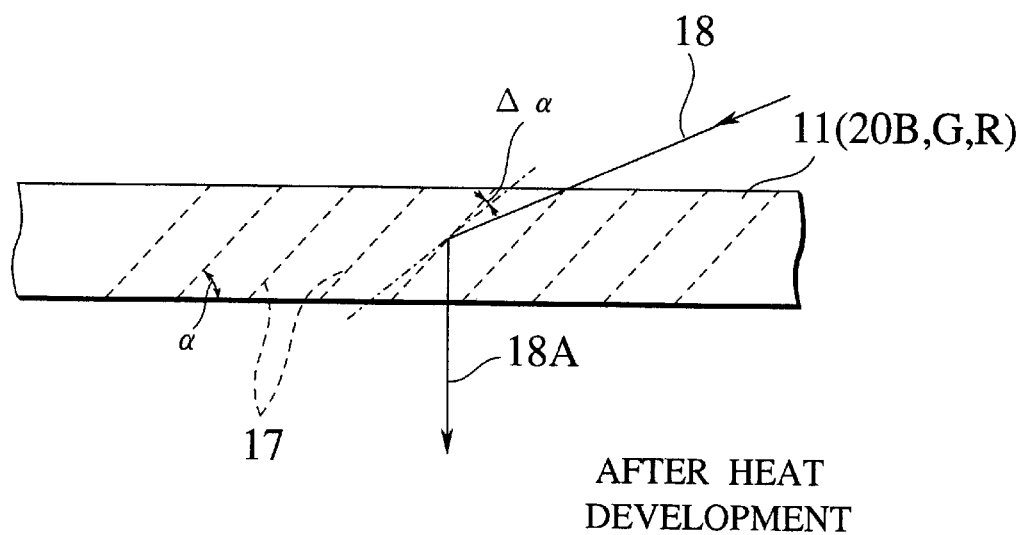
FIG. 11 is a diagram showing a hologram recording material after heat development.

FIG. 10 shows a hologram recording material prior to heat development of a single layer for forming the hologram lens and FIG. 11 shows a hologram recording material after the heat development.

As the hologram recording material 11, for example, photo polymer material can be used. By projecting the reference light 15 and object light 16 thereto so as to make both interfere with each other, the fringe pattern 17 of a similar pitch is formed. Meanwhile, the hologram recording material 11 is formed on the glass substrate (not shown).

In this case, the inclination angle (recording angle) of the fringe pattern 17 is set to an angle smaller than a desired inclination angle $\alpha$ capable of obtaining a final fringe pattern shown in FIG. 11 by a rotation angle $\Delta\alpha$ of the fringe rotation, namely ($\alpha-\Delta\alpha$). The rotation angle $\Delta\alpha$ of the fringe rotation due to such heat development can be obtained by a preliminary measurement. Incident angles $\theta4$, $\theta5$ of the reference light 15 and object light 16 are set so that the inclination angle of the fringe pattern 17 is ($\alpha-\Delta\alpha$). When both the lights 15, 16 are projected, the fringe pattern 17 is formed in a direction of a line dividing an intersection angle of both the lights 15, 16 as described above. In FIG. 10, a relation between the dividing line of the intersection angle $\theta$ and angles $\theta6$, $\theta7$ formed in the emission direction of both the lights 15, 16 is $\theta6=\theta7$.

After the fringe pattern 17 is formed as shown in FIG. 10, the refractivity change is intensified by carrying out heat development by adding heat to the hologram recording material 11. As a result, the fringe pattern 17 rotates so as to increase the inclination relative to a direction parallel to the hologram recording material 11 by only the angle $\Delta\alpha$ thereby producing a fringe rotation. Consequently, the inclination angle of the fringe pattern 17 becomes $\alpha$ thereby achieving an originally targeted inclination angle. Thus, a one-layer hologram lens can be completed.

If reproduced light 18 is projected to the hologram lens 20 (B, G, R) obliquely at an incident angle $\theta4$, a primary diffracted light 18A is emitted under the optimum efficiency in a desired direction, namely, vertically downward in case of FIG. 11, so that the light advances toward a picture element (not shown) as designed. Although the case in which the diffracted light 18A is emitted vertically downward has been described here, this light may be emitted in any direction by determining the inclination angle of the fringe pattern 17 intentionally according to any design.

Further, in case the hologram lenses are structured by overlaying them, as described with FIGS. 2A–2D, the formation of the coating film on the hologram recording material and formation of the fringe pattern are repeated.

Figure 12:
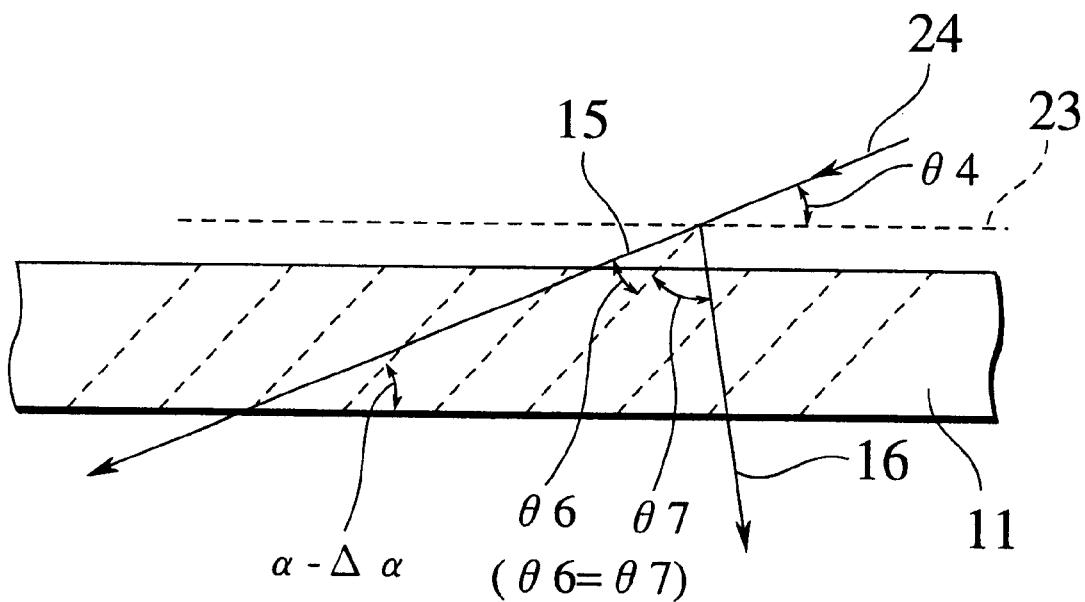
FIG. 12 is a diagram showing a modification of FIG. 10.

Still further, in a case shown in FIG. 10, two lights, namely reference light 15 and object light 16 has been used to form the fringe pattern 17. Instead, as shown in FIG. 12, it is permissible to project the laser beam 24 having a predetermined wavelength to an EB master 23 formed in the form of lattice structure by electron beam at a predetermined angle $\theta4$ so as to obtain the reference light 15 and object light 16 which advance in the same direction as shown in FIG. 10.

As a result, the inclination angle ($\alpha-\Delta\alpha$) of the fringe pattern 17 can be set to any desired angle.

Further, by changing the wavelength of the laser beam 24 for recording or an incident angle $\theta4$, any fringe pattern 17 can be formed.

By combining the hologram color filter having a single stage or multiple stages of the hologram lens formed in the above manner with the space light modulating element, the space light modulating apparatus shown in FIGS. 7 and 9 is achieved.

As described above, according to this embodiment, the recording angle of the fringe pattern prior to heat development is inclined slightly in an opposite direction to the rotation direction of the fringe rotation. Therefore, the rotation angle of the fringe rotation can be compensated for at the time of heat development. Therefore, the diffracted light can be emitted accurately in a desired direction with a high efficiency. Thus, if this is applied to the space light modulating apparatus, the diffracted light can be projected onto a desired picture element accurately as designed.

It should be understood that many modifications and adaptations of the invention will become apparent to those skilled in the art and it is intended to encompass such obvious modifications and changes in the scope of the claims appended hereto.

What is claimed is:

1. A method for producing a transmission-type hologram lens for obliquely receiving light having a specific wavelength and outputting the light at a desired angle, the method comprising the steps of:

a first step for disposing an electron beam master in contact with and opposite to a hologram recording material formed on a glass substrate, the electron beam master being provided with an electron beam lattice generated by an electron beam;

a second step for irradiating exposure light at a predetermined angle from the electron beam master side to form a fringe pattern inclined to a plane of the hologram recording material by an interference between 0 order light which advances straight and primary order light diffracted by the electron beam lattice; and a third step for performing heat development on the hologram recording material in which the fringe pattern is formed, the heat development causing a fringe rotation in which an inclination angle of the fringe pattern to the plane of the hologram recording material increases, wherein the predetermined angle in the second step predictively includes an additional angle for decreasing the inclination angle of the fringe pattern by an angle to be increased by the fringe rotation in the third step to cancel the fringe rotation and obtain a desired inclination angle of the fringe pattern after the heat development.

2. A method for producing a transmission-type hologram lens according to claim 1, the desired angle of the light outputted from the hologram lens is perpendicular to the hologram lens.

3. A method for producing a transmission-type hologram color filter for diffracting and dispersing incident white light into lights of three primary colors of red(R), green(G) and blue(B) and outputting the lights at respective desired angles, the method comprising the steps of:

a first step for disposing an electron beam master for blue light in contact with and opposite to a hologram recording material for blue light formed on a glass substrate, the electron beam master for blue light being provided with an electron beam lattice for blue light generated by an electron beam;

a second step for irradiating exposure light at a predetermined angle from the electron beam master for blue light side to form a fringe pattern inclined to a plane of the hologram recording material for blue light by an interference between 0 order light which advances straight and primary order light diffracted by the electron beam lattice for blue light thereby to produce a hologram lens for blue light;

a third step for applying a hologram recording material for green light on the hologram recording material for blue light and disposing an electron beam master for green light provided with an electron beam lattice for green light in contact with the hologram recording material for green light;

a fourth step for irradiating exposure light at a predetermined angle from the electron beam master for green light side to form a fringe pattern inclined to a plane of the hologram recording material for green light by an interference between 0 order light which advances straight and primary order light diffracted by the electron beam lattice for green light thereby to produce a hologram lens for green light;

a fifth step for applying a hologram recording material for red light on the hologram recording material for green light and disposing an electron beam master for red light provided with an electron beam lattice for red light in contact with the hologram recording material for red light;

a sixth step for irradiating exposure light at a predetermined angle from the electron beam master for red light side to form a fringe pattern inclined to a plane of the hologram recording material for red light by an interference between 0 order light which advances straight and primary order light diffracted by the electron beam lattice for red light thereby to produce a hologram lens for red light; and a seventh step for performing heat development on the respective hologram recording materials for blue light, green light and red light in which the fringe patterns are formed in the second, fourth and sixth steps, the heat development causing a fringe rotation in which an inclination angle of the fringe pattern to the plane of the hologram recording material increases, wherein the predetermined angle in the second, fourth and sixth steps predictively includes an additional angle for decreasing the inclination angle of the fringe pattern by an angle to be increased by the fringe rotation in the seventh step to cancel the fringe rotation and obtain a desired inclination angle of the fringe pattern after the heat development.

4. A method for producing a transmission-type hologram color filter according to claim 3, the respective desired angles of the lights outputted from the hologram color filter are perpendicular to the hologram color filter.

* * * * *